United States Patent [19]

Sincoskie

[11] Patent Number: 4,706,080
[45] Date of Patent: Nov. 10, 1987

[54] INTERCONNECTION OF BROADCAST NETWORKS

[75] Inventor: Walter D. Sincoskie, Union Township, Union County, N.J.

[73] Assignee: Bell Communications Research, Inc., Livingston, N.J.

[21] Appl. No.: 769,555

[22] Filed: Aug. 26, 1985

[51] Int. Cl.$^4$ .......................... G08B 5/00; H04Q 5/00; H04J 3/24
[52] U.S. Cl. ........................ 340/825.02; 340/825.03; 340/825.52; 370/88; 370/94
[58] Field of Search ...................... 340/825.02, 825.03, 340/825.52; 370/60, 94, 85, 88; 364/200, 900

[56] References Cited

U.S. PATENT DOCUMENTS

| | | | |
|---|---|---|---|
| 4,032,899 | 6/1977 | Jenny et al. | 364/200 |
| 4,231,086 | 10/1980 | Tarbox et al. | 364/200 |
| 4,234,919 | 11/1980 | Bruce et al. | 364/200 |
| 4,307,446 | 12/1981 | Barton et al. | 340/825.02 |
| 4,347,498 | 8/1982 | Lee et al. | 340/825.02 |
| 4,384,322 | 5/1983 | Bruce et al. | 364/200 |
| 4,384,327 | 5/1983 | Conway et al. | 364/200 |
| 4,396,978 | 8/1983 | Hammer et al. | 364/200 |
| 4,412,285 | 10/1983 | Neches et al. | 364/200 |
| 4,430,699 | 2/1984 | Segarra et al. | 364/200 |
| 4,433,376 | 2/1984 | Lombardo, Jr. et al. | 364/200 |
| 4,449,182 | 5/1984 | Rubinson et al. | 364/200 |
| 4,597,078 | 6/1986 | Kempf | 370/94 |

FOREIGN PATENT DOCUMENTS 2149625 6/1985 United Kingdom .

OTHER PUBLICATIONS

*Proceedings of the Fifth International Conference on Computer Communication;* "On the Generation of Explicit Routing Tables"; K. Maruyama and G. Markowsky; 9-9-82,; pp. 90-95.
"Local Area Network Connection", *Telecommunications*, Apr., 1984 by B. Stewart, B. Hawe and A. Kirby.
"Transparent Interconnection of Local Area Networks", *Journal of Telecommunications Networks*, Sep., 1984 by B. Hawe, A. Kirby and B. Stewart.
"Local Area Network Applications," i Telecommunications, Sep., 1984 by B. Stewart and B. Hawe.
"An Architecture for Transparently Interconnecting IEEE 802 Local Area Networks", a Digital Equipment Corporation paper submitted to IEEE, Oct., 1984.
"Vitalink Satellite Communications Systems", an information brochure of the Vitalink Communications Corp., Oct., 1984.
"'Bridges' Smooth Troubled Waters for Wide-Area Networking", *Data Communications*, Mar., 1985 by J. H. Hart.

Primary Examiner—Ulysses Weldon
Assistant Examiner—Ralph E. Smith
Attorney, Agent, or Firm—James W. Falk; John T. Peoples

[57] ABSTRACT

A process is disclosed for effecting transmission over a generally cyclic communication system comprising numerous networks interconnected by gateway pairs. Each gateway of each pair implements a store-and-forward protocol whereby each gateway forwards message packets propagated over its associated network except for any packets that are destined for a device which has previously appeared in the sending address of another packet. In order to utilize this protocol as a basis for transmission, the system is covered with a set of spanning trees that satisfy capacity and reliability requirement. Each spanning tree is assigned a unique identifier and each packet traversing the system is assigned to and conveys the specified spanning tree. Each gateway passes the packet to determine the assigned spanning tree and forwards the packet accordingly. To mitigate system flooding by a newly connected device, the protocol may also incorporate a delay to allow the gateways to learn the location of the new device.

6 Claims, 11 Drawing Figures

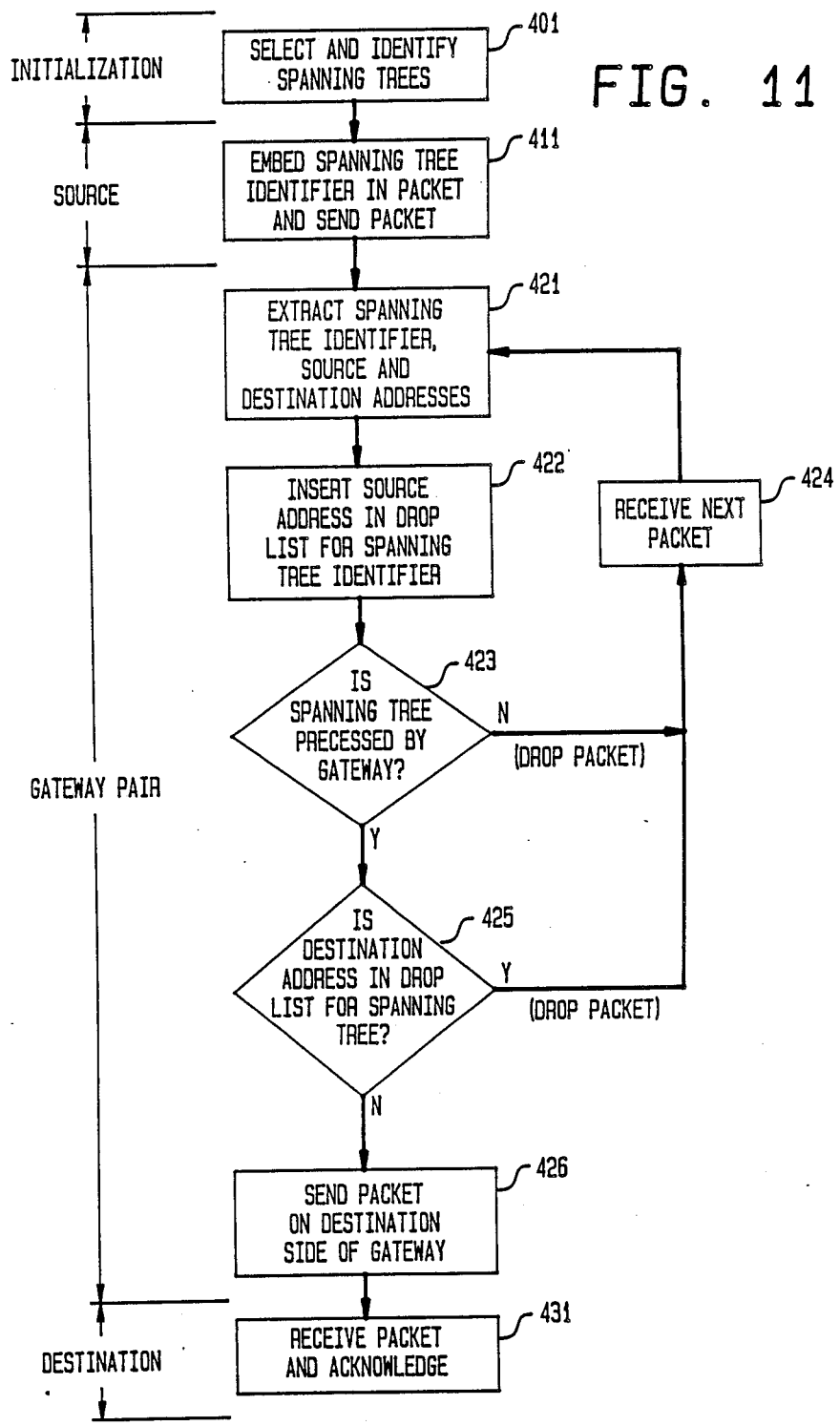

INTERCONNECTION OF BROADCAST NETWORKS

FIELD OF THE INVENTION

This invention relates generally to a communication system formed by interconnecting a plurality of independent networks and, more particularly, to a methodology and arrangements for effecting interconnection of the separate networks without imposing topological constraints.

BACKGROUND OF THE INVENTION

Oftentimes it is required to expand the coverage of local area networks (LANs) by interconnecting these LANs to create a geographically-disperse metropolitan area network. Also, an organization such as a university or a company that operates a distinct set of LANs, say within a building complex, may find it necessary to interconnect these LANs to effect a large LAN serving the entire complex.

If a device (e.g., computer, video terminal, telephone set) connected to one LAN has only one path to a device on another LAN after interconnection, thereby exhibiting a loop-free topology, interconnection may be achieved by connecting pairs of networks with a so-called gateway that executes a store-and-forward protocol. Such an interconnection arrangement is described as a transparent interconnection since the existence of the gateway is not visible to any of the devices in the linked system and, consequently, no modifications to the devices or the messages or packets propagated by the devices are required.

Recently, a number of references have discussed the methodology and associated circuitry for the transparent interconnection arrangement. These include: (1) "Local Area Network Applications", *Telecommunications,* September, 1984 by B. Hawe and B. Stewart; (2) "An Architecture for Transparently Interconnecting IEEE 802 Local Area Networks", a Digital Equipment Corporation Technical paper submitted to the IEEE 802 Standards Committee in October, 1984; and (3) "Transparent Interconnection of Local Networks with Bridges", *Journal of Telecommunications Networks,* October, 1984 by B. Hawe, A. Kirby and B. Stewart. These references stress that the physical topology of the interconnected networks must be that of a branching tree. Gateways cannot transparently interconnect local area networks that support alternative paths between local networks resulting in loops. In fact, in reference (1), a technique is suggested for transforming a general mesh topology to a loop-free topology so that the gateways may be utilized.

The requirement that the system topology be loop-free is a severe one in general, and ultimately restricts the practical application of the conventional gateway arrangement. In order to satisfy channel capacity demands or to provide a degree of reliability, an interconnected system will contain some loops in some portions of the topology. The conventional gateways always detect and remove these loops, preventing any improved redundancy or reliability. The problem of interconnecting loop or cyclic topologies at the physical or link layer has not been addressed by prior art references.

SUMMARY OF THE INVENTION

This restriction of requiring loop-free topologies for the transparent interconnection of local area networks with store-and-forward gateways is obviated, in accordance with the present invention, by a method that utilizes routing information conveyed by the message packets.

Broadly speaking, the overall system topology is represented by an undirected, connected graph wherein networks map into vertices and gateways into edges. A set of spanning trees is defined for the graph to provide the required capacity and necessary redundancy. Each spanning tree is uniquely identified. Each message packet that traverses the overall system is assigned to a specific spanning tree so the packet travels between nodes along edges contained in the specified spanning tree. Each gateway, with an expanded store-and-forward protocol, parses the packet to determine the assigned spanning tree and forwards the message accordingly. In one embodiment of the present invention, the device originating the packet specifies the spanning tree identifier and conveys it either explicitly or implicitly in the packet.

To reduce numerous potentially unnecessary transmissions through the system by a device newly connected to one of the networks, the protocol may also incorporate a delay to allow gateways to learn the location of the new device. The augmented protocol then implements a store-delay-forward algorithm.

The organization and operation of this invention will be better understood from a consideration of the detailed description thereof, which follows, when taken in connection with the accompanying drawing.

BRIEF DESCRIPTION OF THE DRAWING

FIG. 11 is a flow diagram illustrative of the steps for propagating a packet through a general cyclic system.

DETAILED DESCRIPTION

For clarity of exposition, it is helpful initially to describe a conventional gateway arrangement, focusing on methodology, so as to provide a basis for the fundamental concepts of the present invention. This basis introduces foundational concepts and terminology which facilitate later presentation of the embodiments illustrative of the departure from the art.

1. Fundamental Basis

Figure 1:
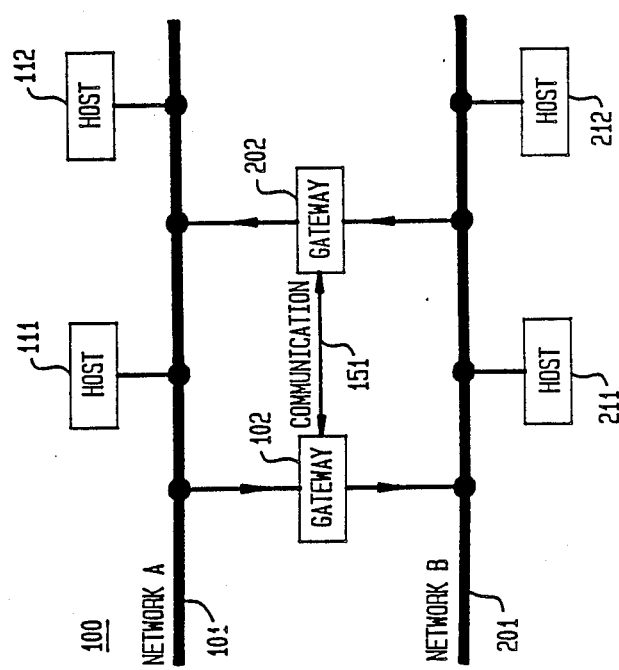
FIG. 1 is a block diagram depicting the gateway pair arrangement for interconnecting two local area networks.

With reference to FIG. 1, two networks 101 and 201, labelled NETWORK A and NETWORK B, respectively, are interconnected by a pair of unidirectional gateways 102 and 202 to form overall communication system 100. Gateways 102 and 202 are linked in a manner such that gate 202 ignores transmissions by gate 102 on NETWORK B. Gate 102 also ignores transmissions by gate 202 on NETWORK A.

Each separate network typically serves a plurality of devices or hosts. In FIG. 1, hosts 111 and 112 and hosts 211 and 212 are connected to and communicate over networks 101 and 201, respectively. Each host is presumed to have a unique address and each network has broadcast capability, that is, if one host is transmitting a packet, all other gateways on the common network receive the packet.

Each packet propagated over a network includes a sending host address and a destination host address as well as the actual message data. One of the gateways interconnecting the two networks is arranged to receive every packet transmitted on a given network. For instance in FIG. 1, gateway 102 is the receiver for all packets transmitted on network 101.

A store-and-forward protocol implemented by each gateway is as follows: a gateway forwards each packet propagated over its associated network except for a packet that is destined for a host which has previously appeared in the sending address of another packet. Thus, whenever a host first transmits a packet, each gateway the packet passes through "learns" of the location of the host. When a second host later sends a packet to the first host, the packet automatically proceeds over the optimal path through the system.

Figure 2:
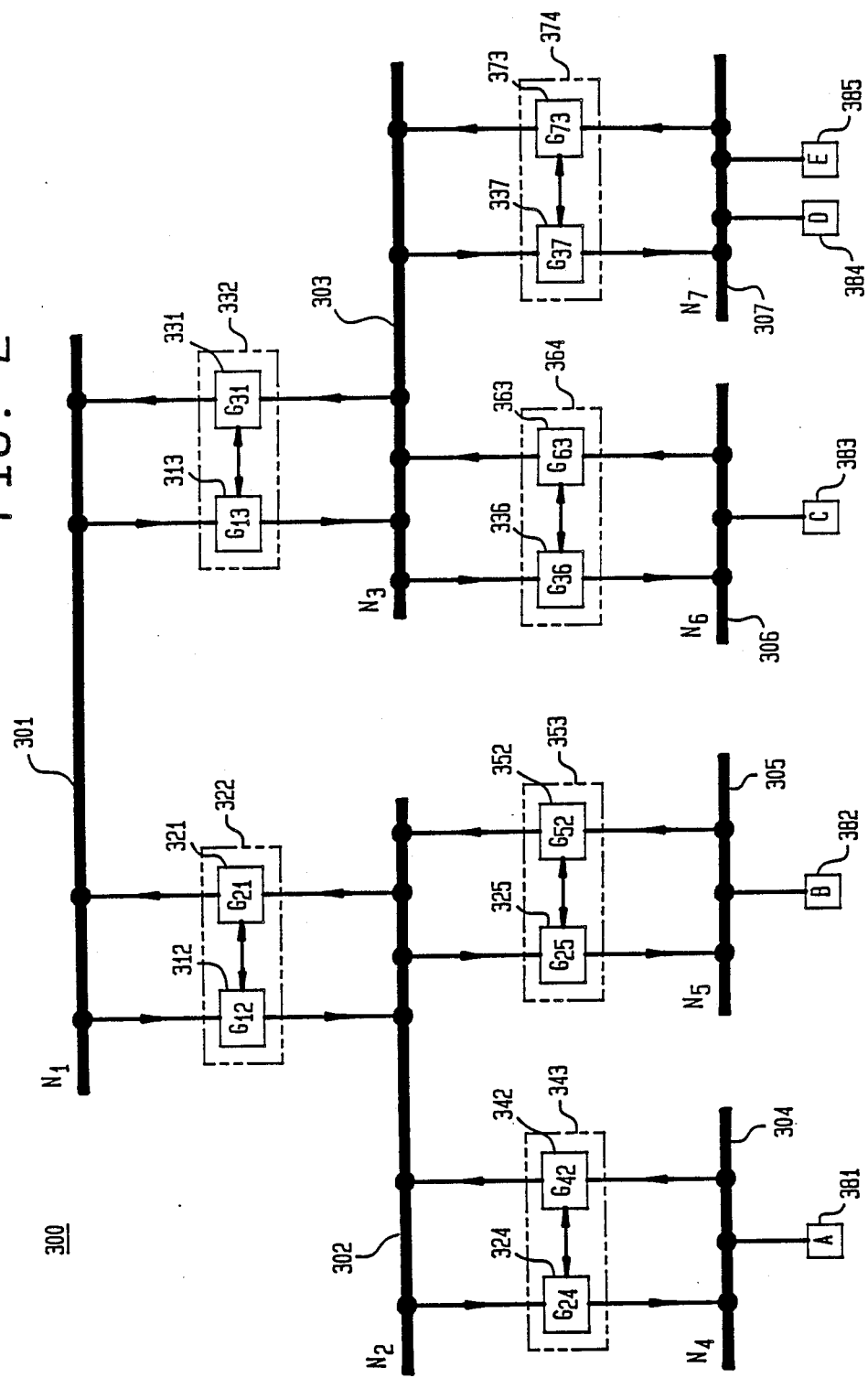
FIG. 2 is an exemplary loop-free three-level hierarchical system depicting the interconnection of a plurality of local area networks with numerous gateway pair arrangements.

To illustrate this protocol in some detail, system 300 of FIG. 2 is considered. This arrangement comprises numerous networks connected by pairs of gateways with each of the gateways executing the above algorithm.

In order to define the protocol precisely, the following notation is utilized:

$N_i$: Network number i (elements 30i), i=1, ... 7
$G_{ij}$: Gateway from network i to network j (elements 3ij)
A,B,C,D,E: Host computers (element 381,382, ... ,385, respectively)
$P_{XY}$: Packet transmitted from host X to host Y
→: "is retransmitted on"
$D_{ij}$: Set of hosts, stored in $G_{ij}$, for which transmission is blocked through $G_{ij}$ ($D_{ij}$ is called the "drop filter").

Figure 3:
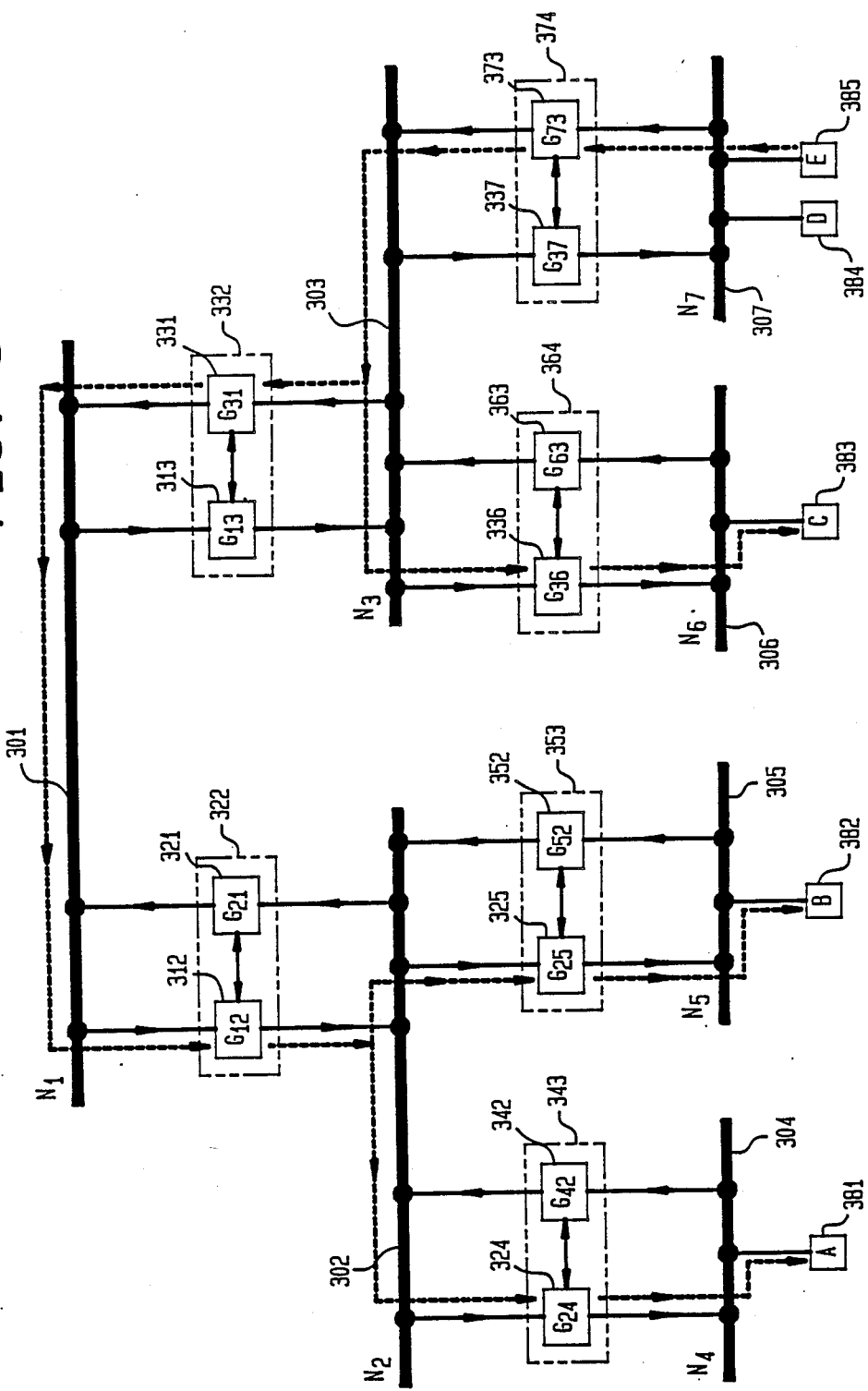
FIG. 3 illustrates the manner in which the first packet from a given local area network propagates throughout the system of FIG. 2 after network initialization and depicts the capability of the network to learn of the location of the source of the first packet.

It is assumed that the arrangement of FIG. 2 has been initialized, that is, $D_{ij}=\phi$ (the empty set), for all i,j and now there is a transmission from host E to host C ($P_{EC}$):

1. $P_{EC}$ traverses $N_7$
2. $D_{73}=\{E\}$, and $P_{EC}\rightarrow N_3$ by $G_{73}$
3. 
   $D_{36}=\{E\}$, and $P_{EC}\rightarrow N_6$ by $G_{36}$
   $D_{31}=\{E\}$, and $P_{EC}\rightarrow N_1$ by $G_{31}$
4. 
   $D_{12}=\{E\}$, and $P_{EC}\rightarrow N_2$ by $G_{12}$
5. 
   $D_{24}=\{E\}$, and $P_{EC}\rightarrow N_4$ by $G_{24}$
   $D_{25}=\{E\}$, and $P_{EC}\rightarrow N_5$ by $G_{25}$ $P_{EC}$ reaches its destination in step 3, but it continues and floods the network. This is diagrammed by the dotted lines in FIG. 3.

Figure 4:
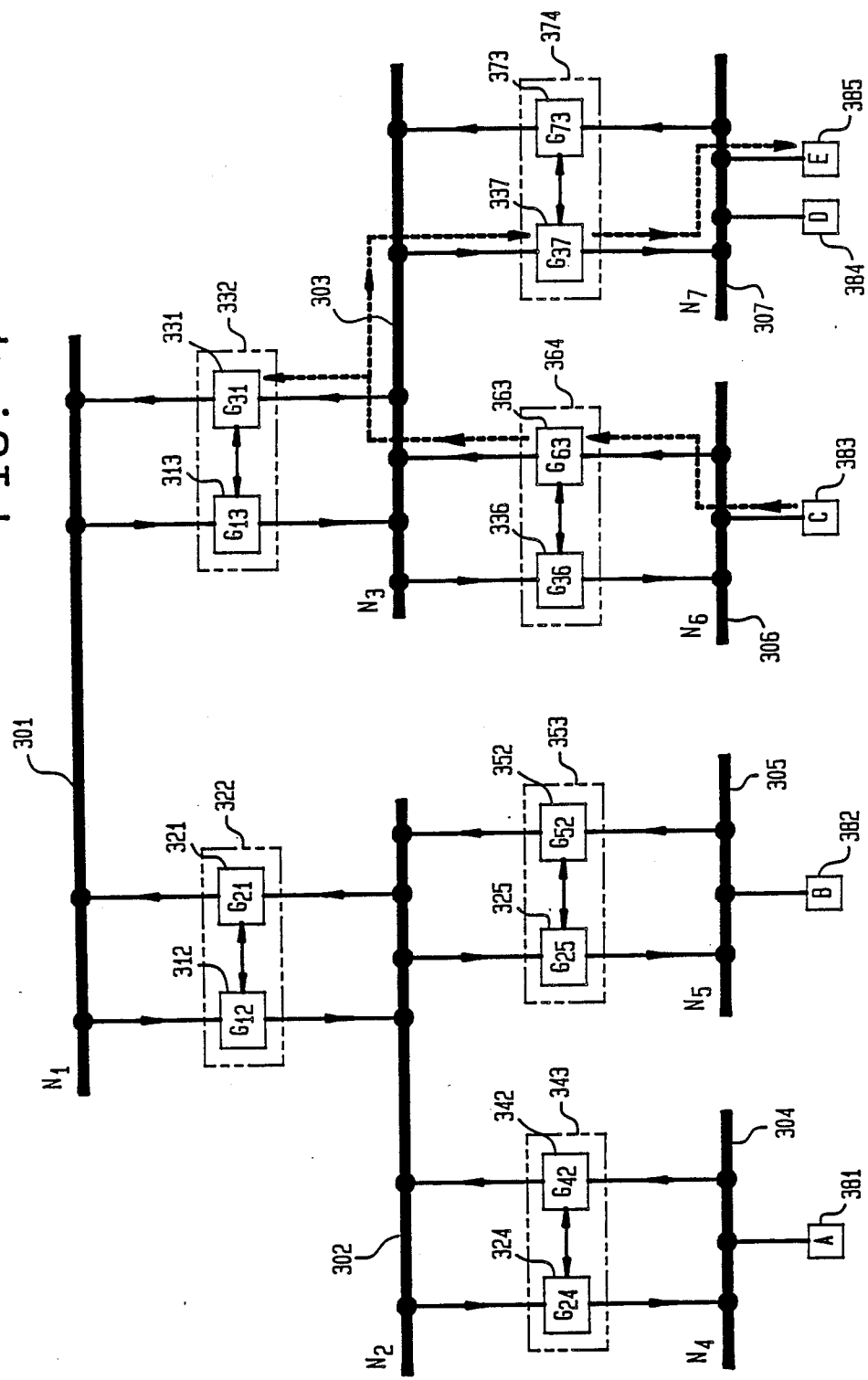
FIG. 4 depicts the propagation of a return packet through the system of FIG. 2 and illustrates that the network has "learned" of the location of the source of the reply packet.

Now, a return packet $P_{CE}$ is considered with reference to FIG. 4:

1. $P_{CE}$ traverses $N_6$
2. $D_{63}=\{E\}$, and $P_{CE}\rightarrow N_3$ by $G_{63}$
3. 
   $D_{31}=\{C,E\}$, and $P_{CE}$ is dropped by $G_{31}$
   $D_{37}=\{C\}$, and $P_{CE}\rightarrow N_7$ (and host E) by $G_{37}$.

Since the location of host E was "known" from the transmission of $P_{EC}$, the return packet took the optimum route through the network.

Figure 5:
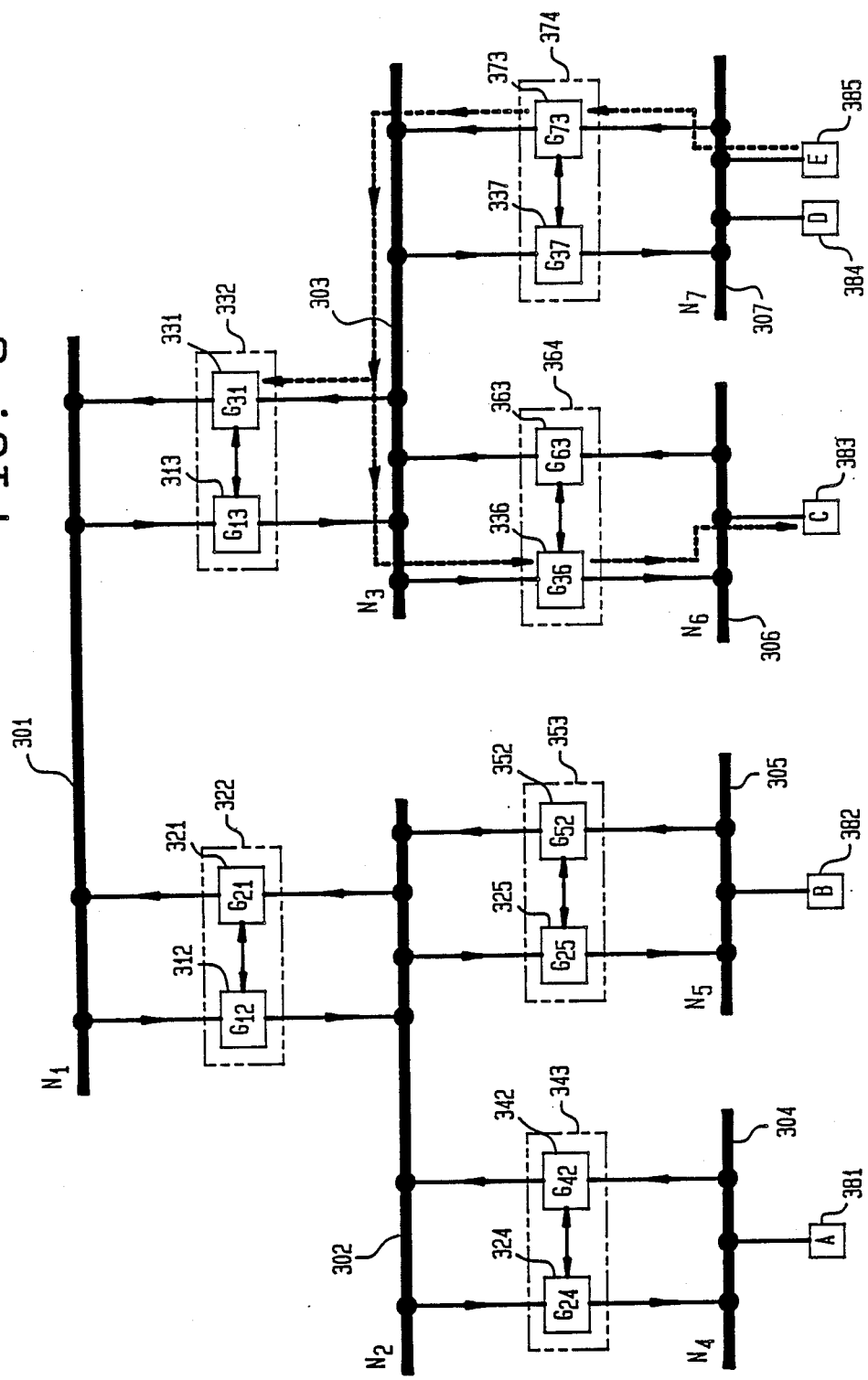
FIG. 5 shows the propagation of the second packet from the given local area network of FIG. 2 and demonstrates that the gateways have "learned" the identification of the packet source and are now optimally routing all future packets from a given device.

As a final consideration, it is supposed that a second packet $P_{EC}$ is to be transmitted through the network, as depicted in FIG. 5:

1. $P_{EC}$ traverses $N_7$
2. $D_{73}=\{E\}$, and $P_{EC}\rightarrow N_3$ by $G_{73}$
3. 
   $D_{31}=\{C,E\}$, and $P_{EC}$ is dropped by $G_{31}$
   $D_{36}=\{E\}$, and $P_{EC}\rightarrow N_6$ (and host C) by $G_{36}$.

In fact, for any $k\neq E$, $P_{kE}$ will only traverse the necessary networks. Since $P_{CE}$ was only received by $G_{63}$, $G_{31}$ and $G_{37}$, only part of the overall network "knows" the location of host C. However, the rest of the network will learn about host C if and when it transmits to other hosts. Once steady-state is achieved, each $G_{ij}$ has a so-called "block" or "drop" list $D_{ij}$ that provides optimal routing and inhibits extraneous transmissions.

2. Extensions to Protocol Arrangement

Figure 6:
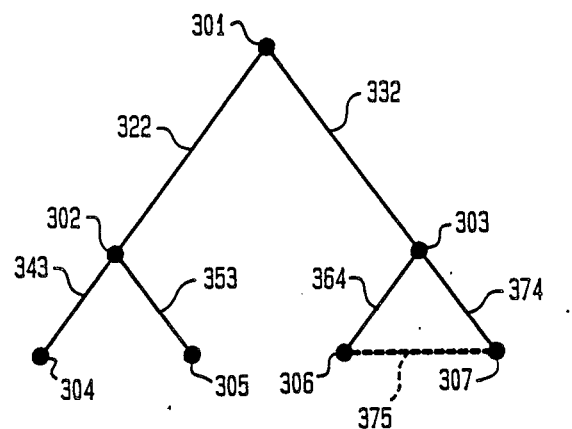
FIGS. 6 and 7 are graphical representations of the system of FIG. 2 illustrating two different spanning trees for the system.

It can be deduced from the above description that system 300 must have only one path between any pair of hosts in order to prevent a packet from "looping" between two gateways forever. More specifically, if a system is mapped onto an undirected graph by mapping networks onto vertices and gateway pairs to edges, the resulting graph must be loop-free to properly function, that is, the topology of system 300 is restricted to that of an acyclic graph. FIG. 6 is a depiction of the topology of system 300 in graph form. Pairs of gateways from FIG. 2 have been grouped and assigned the indicia now used in FIG. 6 to define the graph edges (solid lines). This graph is acyclic since each pair of nodes is connected by only one path. If, for instance, nodes 306 and 307 were directly connected (shown as dashed edge 375 in FIG. 6), then the graph would be cyclic.

Systems that are cyclic cannot directly utilize the previously discussed store-and-forward protocol or algorithm. For example, from FIG. 6 with nodes 306 and 307 also directly connected, a packet sent from a host on node 303 to a host on node 306 would loop forever in a path 303-307-306-303-307..., and the same packet would loop in another path 303-306-307-303-306 .... The looping packets would saturate the gateways and networks on their loops and inhibit normal communications.

Figure 7:
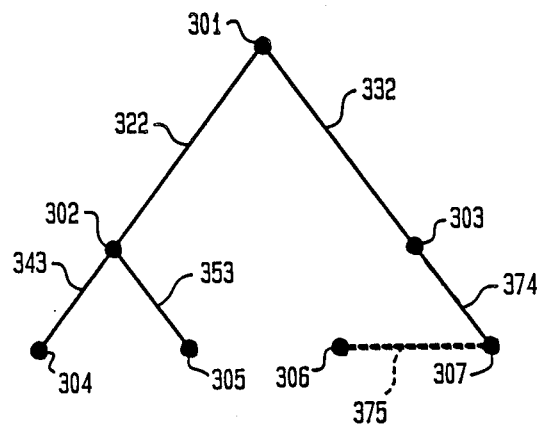

The solid-line structure of FIG. 6 is called a spanning tree, that is, in a spanning tree every pair of nodes is connected by only one path. The graph of FIG. 7 depicts another spanning tree for the node arrangement of FIG. 6. In general, an arbitrary graph will have a plurality of spanning trees.

To implement the improvement in the gateway-protocol arrangement in accordance with one aspect of the present invention, a set of spanning trees is selected for the cyclic graph according to predetermined guidelines. Each spanning tree is assigned a unique identifier or number and each message traversing the system is assigned to a unique spanning tree via its identifier. Any gateway receiving this message determines the tree number and then routes the message over the specified spanning tree and drops all packets of other spanning trees. Typically, the device originating the message specifies the spanning tree number, either explicitly or implicitly. For instance, with the explicit approach, a "tree number" field could be added to the packet specifications, say as an extra bit in the header of the packet. With the implicit approach, a spanning tree number could be generated from fields normally occurring in the packet such as the source and destination addresses. An appropriate example function might be spanning tree number=(source 'exclusive or' destination) modulo N, where N is the number of spanning trees in the network. This has the benefit that all traffic between a pair of hosts will travel on only one spanning tree, thus minimizing the occupied drop lists across the system.

Figure 8:
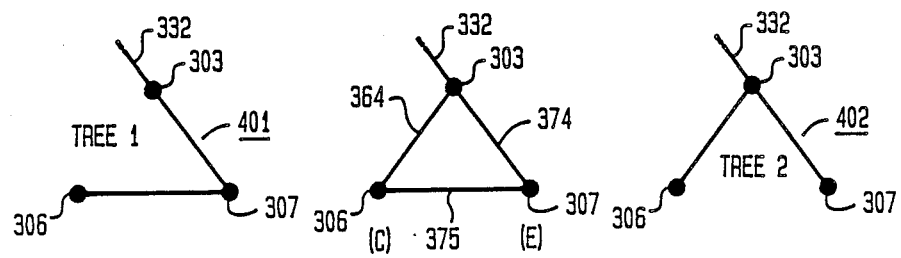
FIG. 8 shows a cyclic graph extension for a portion of the system of FIG. 2 as well as two acyclic graphs that cover the extension.

The graph in the center of FIG. 8 is a reconstruction of both the solid and dashed line portions of the graph of FIG. 6 involving nodes 303, 306 and 307 as well as edges 364, 374 and 375. The graph of FIG. 8 is cyclic. To arrive at this new configuration, it may be presumed, for example, that system 300 of FIG. 2 was modified to include a gateway pair (edge 375) interconnecting nodes 306 and 307. Edge 375 may provide for increased message traffic from node 306 to 307 that edges 364 and 374 can no longer handle without overload.

Since the graph of FIG. 8 is cyclic, a set of spanning trees is selected. Two spanning trees that cover this graph are depicted in the left and right diagrams of FIG. 8 as graphs 401 and 402, respectively. If the notation M(S;D;T) is used, where S is the source node, D is the set of destination nodes and T is the spanning tree number, then one possible message routing assignment algorithm for nodes 303, 306 and 307 is as follows:

M(303;306,307,301, . . . ;2),
M(306;303,307,301, . . . ;1), and
M(307;303,306,301, . . . ;2).

This particular assignment utilizes edge 375 only for messages originating from node 306, presumably for load-balance purposes. If edge 375 becomes disabled, the devices associated with node 306 could be notified to change the assignment to M(306;303,307,301, . . . ;2), thereby maintaining communication within the system. The plurality of spanning trees in a cyclic network provides redundancy between certain nodes although there may be some loss in performance during outages of corresponding gateways.

In general, gateways that appear in different spanning trees must maintain a drop list for each spanning tree. For instance, from FIG. 8, if $D(k)_{ij}$ represents the drop list for the kth spanning tree, then packets transmitted from host C to host E ($P_{CE}$) on both trees yield upon start-up for edge 374:

$D(1)_{37}=\phi$, $D(2)_{37}=\{C\}$,
$D(1)_{73}=\{C\}$ and $D(2)_{73}=\phi$.

The necessity of maintaining multiple drop lists may be mitigated on an arbitrary graph by selecting most of the spanning trees in a set so that no edge is contained in more than one spanning tree.

Even when a system is acyclic, it is oftentimes necessary to utilize, in effect, multiple spanning trees so as to provide sufficient communication capacity. Another aspect of the present invention encompasses this situation. Illustrative of this case is a tree-shaped system, such as a public or private telephone network hierarchy, that covers a large geographic area. These systems tend to bottleneck at or near the root. Instead of using disjoint spanning trees, wherein no edge is contained in more than one spanning tree, capacity considerations require essentially identical spanning trees to be overlaid on the graph. This is demonstrated with reference to the graph of FIG. 9, which is FIG. 6 redrawn to show two spanning trees (one is solid, the other is dashed) for a three-level hierarchy.

In this case, only one gateway pair implements edge 343 in each of the two spanning trees. However, edge 322 is implemented with two gateway pairs, one for each spanning tree. Similarly, edges 353, 364 and 374 deploy one gateway pair for both trees, whereas edge 332 comprises two gateway pairs. Because of this strategic arrangement, the drop list for edge 343 (also edges 353, 364 and 374) is the same for each spanning tree, so only one list must be maintained. Similarly, the drop list of edge 322 (edge 332 also) is the same, but this is less significant since two separate gateway pairs are utilized.

Figure 9:
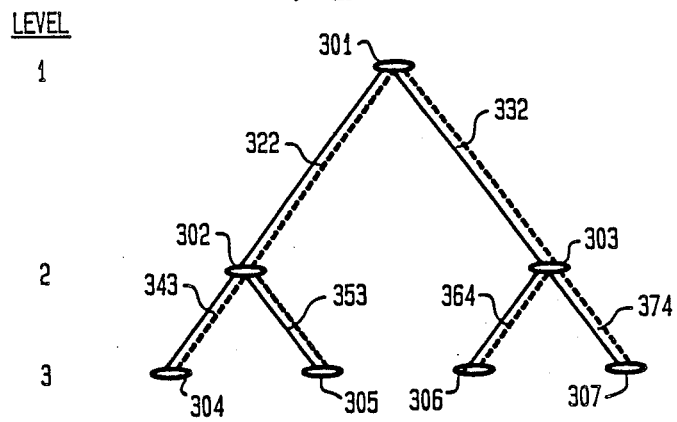
FIG. 9 is a graph representing the system of FIG. 2 with two spanning tree overlays to enhance system throughput.
Figure 10:
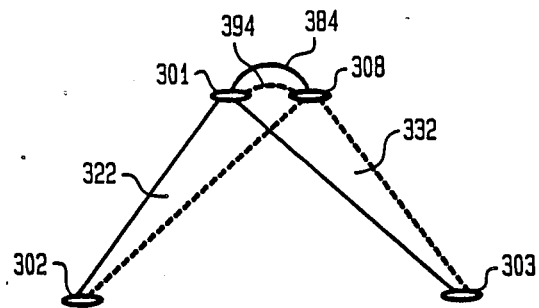
FIG. 10 is a graph of a portion of FIG. 9 showing a replicated node to reduce traffic congestion in the single node.

The network in FIG. 9 replicates the gateways between levels 1 and 2 (edges 322 and 332) to reduce congestion. However, congestion may also occur in the nodes. FIG. 10 shows a portion of the network of FIG. 9 with node 301 replicated (node 308) to reduce the traffic passing through node 301. This network will work properly as long as no hosts are connected to nodes 301 or 308. If hosts are connected to nodes 301 and 308, gateway pairs must be added at edges 384 and 394 to provide complete connectivity.

The strategy of adding parallel edges and nodes throughout a system has no limitation on number of levels that are replicated, or with the number of parallel edges and nodes that are added. Because of this property, networks with arbitrarily large throughput can be built. These networks have the desirable property that unreplicated edges can be implemented with only a single drop filter, regardless of the number of spanning trees used.

FIG. 11 is a flow diagram illustrative of the steps for propagating each packet throughout a system employing spanning trees. Block 401 indicates that a set of spanning trees for the system is preselected to satisfy capacity and reliability considerations and then each tree is assigned a unique identifier. As is indicated by block 411, for each packet originated and then propagated over its associated source network by a device, a preselected spanning tree identifier is embedded in the packet. Each gateway that receives the propagated packet determines the identifier embedded in the packet as well as the source and destination devices originating and receiving the packet; this is depicted by block 421. As shown by block 422, the source address of the packet is inserted in the drop list for the particular spanning tree identifier if the address is not already present. Also, as indicated by decision block 423, if this gateway is not processing the particular spanning tree found in the packet, the packet is dropped. In addition, as shown by decision block 425, if the destination of the packet is found in the drop list for the spanning tree, then the packet is also dropped; otherwise, the packet is broadcast by the gateway, as depicted by block 426. At the destination device, the packet is detected and an acknowledgement packet is generally returned to the source device, as indicated by block 431. The return packet may not necessarily traverse the same spanning tree as the original packet, but for efficiency reasons, it should traverse the same tree whenever feasible.

In any system, but particularly a large system, when a new host is placed into service, messages to the new host from any LAN may flood the system until the system learns the location of the new host. To illustrate this point, which is yet another aspect of the present invention, the right-hand portion of FIG. 2, namely networks 303, 306 and 307 ($N_3$, $N_6$ and $N_7$), gateways 337 and 373 ($G_{37}$ and $G_{73}$) and hosts 384(D) and 385(E) are considered. It is supposed that host 384 is placed into service and there is a packet $P_{ED}$ traversing network 307. Since gateway $G_{73}$ has not learned of host 384 yet, that is, the drop filter does not have host D in its list, normally this packet would flood the system. However, if gateway $G_{73}$ delays repeating packet $P_{ED}$ for some time period ($T_D$) that is greater than the average acknowledge response time of host 384, then gateway $G_{73}$ will add host 384 to its drop list ($D_{73}=\{E,D, \ldots\}$). Upon reconsideration of packet $P_{ED}$ by gateway $G_{73}$, retransmission to network 303 ($N_3$) as well as the propagation of this packet throughout the system is avoided. This is a particularly important consideration if host 384 is generalized so as to describe any communications device, such as a telephone set or data set, and the networks 306, 307, . . . are local switching networks.

This delay-before-forwarding protocol may also be combined with the spanning tree protocol to yield still another aspect of the present invention. With reference to FIG. 11, a store-and-delay block followed by another decision block would be interposed between blocks 425 and 426. After a predetermined delay in the first new block, the new decision block would test for the same condition as does block 425. If the destination address is now in the drop list, the packet is dropped; otherwise, the packet is processed by block 426.

In yet another aspect of the present invention, to further mitigate network flooding and reduce delays, the gateway pairs can be arranged to communicate their drop lists to each other. Then, if host D is contained in the drop list for gateway $G_{37}$ indicating that host D is not on network 307 ($D_{37}\{\ldots,D,\ldots\}$), $P_{ED}$ should be repeated immediately. The complete algorithm for gateway pair $G_{73}$ and $G_{37}$ for packet $P_{ED}$, combining both communication and delay, becomes:

1. If D is contained in $D_{73}$, packet $P_{ED}$ is not repeated;
2. If D is contained in $D_{37}$, packet $P_{ED} \rightarrow N_3$;
3. If D is not contained in $D_{37}$ and D is not contained in $D_{73}$, packet $P_{ED}$ is delayed or stored in $G_{73}$ for a time $T_D$, and then resubmitted.

For a gateway pair that incorporates a time delay, block 425 of FIG. 11 may be expanded to execute a test to decide if the destination device is in the droplist for the tree in the reverse propagation direction whenever the test is not successful in the forward direction. If this additional test is successful, the packet is propagated on the associated spanning tree. If the test is not successful, the packet is stored for a preselected interval and is then resubmitted to block 425 for final disposition.

It is to be further understood that the methodologies and associated arrangements described are not limited to the specific forms disclosed, but may assume other embodiments limited only by the scope of the appended claims.

What is claimed is:

1. A method for transmitting packets over a system comprising a plurality of networks interconnected by gateways, each of said packets having a sending address and a destination address, said method characterized by the steps of configuring each of said gateways to implement the routing algorithm of forwarding any of said packets received by said each gateway except for said any of said packets destined for one of said networks having a sending address appearing in any previously counted ones of said packets, said sending appearances being stored in a drop list within said each gateway.

selecting a set of spanning trees for said system, conveying by each of said packets an identifier indicative of one of said trees, and, for said each packet, extracting said sending address and said destination address from said each packet within each of said gateways, if said sending address is not in said drop list of said each gateway, adding said sending address to said drop list, if said destination address is not in said drop list, storing said each packet for a predetermined time interval wherein subsequent ones of said packets are processed by said each gateway, and routing of said each packet by said gateways through said system on one of said spanning trees in correspondence with said identifier whenever said destination address is not in said drop list after said time interval; otherwise, no longer storing said each packet within said each gateway.

2. The method as recited by claim 1 further comprising the step of returning an acknowledgement packet over said one of said trees.

3. A method for propagating packets by a gateway, each of said packets comprising a source address and a destination address, said method characterized by the steps of configuring said gateway to implement the routing algorithm of forwarding any of said packets received by said gateway except for any of said packets having a destination address appearing as the source address in any previously routed ones of said packets, said source appearance being stored in a drop list; and, for each packet, extracting said source address and said destination address from said packet within said gateway;

if said source address is not in said drop list, adding said source address to said drop list, if said destination address is not in said drop list, storing said packet for a predetermined time interval whereon subsequent ones of said packets are processed by said gateway; and routing said packet if said destination address is not in said drop list after said time interval; otherwise, no longer storing said packet within said gateway.

4. A method for processing a packet by a first gageway from a gateway pair wherein said first gateway has a first drop list readable by the second gateway and said second gateway has a second drop list readable by said first gateway, said packet comprising a source address and a destination address, each said drop list comrpising source addresses of previous packets processed by the corresponding gateway, and said method characterized by the steps of extracting said source address and said destination address from said packet within said first gateway, if said source address is not in said first drop list, inserting said source address in said first drop list, reading said second drop list and, if said destination address is in said second drop list, forwarding said packet by said first gateway, if said source address is not orignially in said first drop list and said destination address is not in said second drop list, storing said packet by said first gateway for a predetermined time interval wherein subsequent packets are processed by said gateway pair, and forwarding said packet if said destination address is not in said first drop list after said interval; otherwise, no longer storing said packet by said first gateway.

5. A method for transmitting a packet over a system comprising a plurality of networks interconnected by gateways, said packet originated by a source device connected to one of said networks and destined for a destination device connected to one of said networks, said packet including a source address and a destination address, and said method comprising the steps of defining an undirected graph representative of the system wherein said networks map onto graph nodes and said gateways map onto graph paths, defining a spanning tree on said graph such that every pair of said nodes is connected by only one of said paths and selecting a plurality of spanning trees for said graph according to predetermined system guidelines, configuring each gateway with source address lists in correspondence to the number of trees having said each gateway comprising one of said paths, assigning, by said source device, one of said trees to broadcast said packet and associating with said packet an identifier indicative of said one of said trees, broadcasting said packet by said source device through the system on said one of said trees, for each gateway receiving said packet,
(i) determining for each said packet said source address, said destination address and said packet identifier,
(ii) if said receiving gateway does not process packets having said identifier, inhibiting forwarding of said packet; otherwise, inserting said source address in the corresponding one of said lists associated with said identifier
(iii) inhibiting forwarding of said packet if said destination address is in said corresponding one of said lists; otherwise, storing said packet for a prescribed time interval and then submitting said packet for processing by step (iv), and,
(iv) inhibitng forwarding of said packet if said destination address is in said corrsponding list; otherwise, forwarding said packet by said receiving gateway, and acknowledging the reception of said packet by said destination device by broadcasting a return packet over said one of said trees.

6. A method for transmitting a packet over a system comprising a plurality of networks interconnected by gateways, said packet orginated by a source device connected to one of said networks and destined for a destination device connected to one of said networks, said packet including a source address and a destination address, and said method comprising the steps of defining an undirected graph representative of the system wherein said networks comprise graph nodes and said gateway comprise graph paths, defining a spanning tree on said graph such that every pair of said nodes is connected by only one of said paths and selecting a plurality of spanning trees for said graph according to predetermined system guidelines, configuring each gateway with source address lists in correspondence to the number of trees having said each gateway comprising one of said paths, wherein said lists reduce to a common list whenever said selection of spanning trees results in identical ones of said lists for said each gateway, assigning, by said source device, one of said trees to boradcast said packet and associating with said packet an identifier indicative of said one of said trees, broadcasting said packet by said source device through the system on said one of said trees, and for each gateway receiving said packet,
(i) determining for each said packet said source address, said destination address and said packet identifier,
(ii) if said receiving gateway does not process packets having said identifier, inhibiting forwarding of said packet; otherwise, inserting said source address in the corresponding one of said lists associated with said identifier, and
(iii) inhibiting forwarding of said packet if said destination address is in said corresponding list; otherwise, forwarding said packet by said receiving gateway.

* * * * *

UNITED STATES PATENT AND TRADEMARK OFFICE
CERTIFICATE OF CORRECTION

PATENT NO. : 4,706,080

DATED : November 10, 1987

INVENTOR(S) : Walter D. Sincoskie

It is certified that error appears in the above-identified patent and that said Letters Patent is hereby corrected as shown below:

ON TITLE PAGE:
In the Abstract, line 12, "requirement" should read --requirements--;
line 15, "passes" should read --parses--.
Column 4, line 20, that portion of the formula reading $$D_{63}=\{E\}, \quad \text{should read} \quad D_{63}=\{C\},$$

Column 8, line 23, "counted" should read --routed--;
line 59, "appearance" should read --appearances--;
line 67, "whereon" should read --wherein--.
Column 9, line 4, "gageway" should read --gateway--.
Column 10, line 40, "boradcast" should read --broadcast--.

Signed and Sealed this

Third Day of December, 1991

*Attest:*

HARRY F. MANBECK, JR.

*Attesting Officer*　　　*Commissioner of Patents and Trademarks*